Dec. 6, 1938.  W. O. MIESSNER  2,138,875
THEME FINDER
Filed July 15, 1936  3 Sheets-Sheet 1
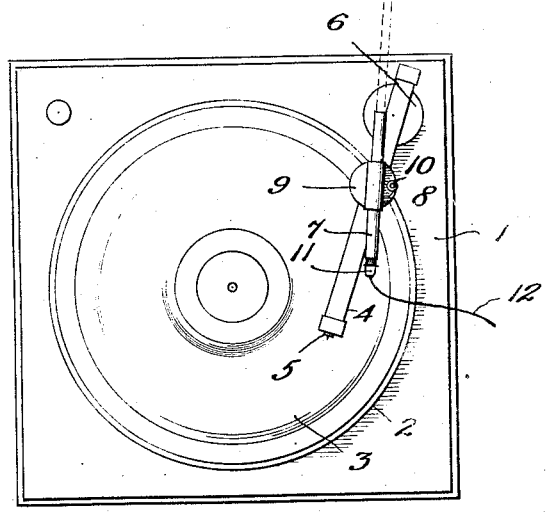
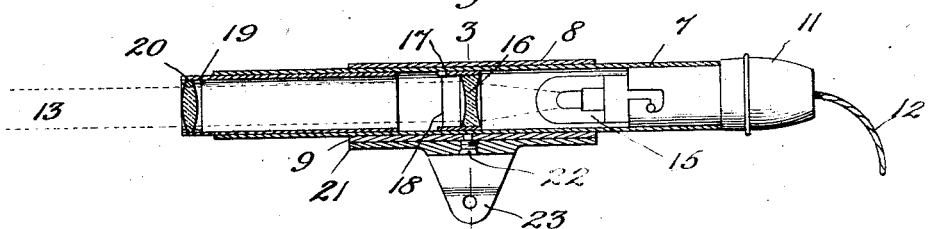
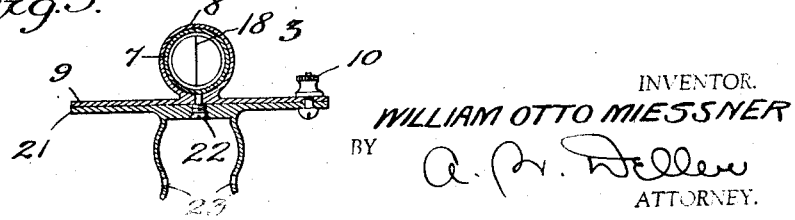
INVENTOR.
WILLIAM OTTO MIESSNER
BY
ATTORNEY.

Dec. 6, 1938.    W. O. MIESSNER    2,138,875
THEME FINDER
Filed July 15, 1936    3 Sheets-Sheet 2

INVENTOR.
WILLIAM OTTO MIESSNER
BY
ATTORNEY.

Dec. 6, 1938.  W. O. MIESSNER  2,138,875
THEME FINDER
Filed July 15, 1936   3 Sheets-Sheet 3

Fig. 6.

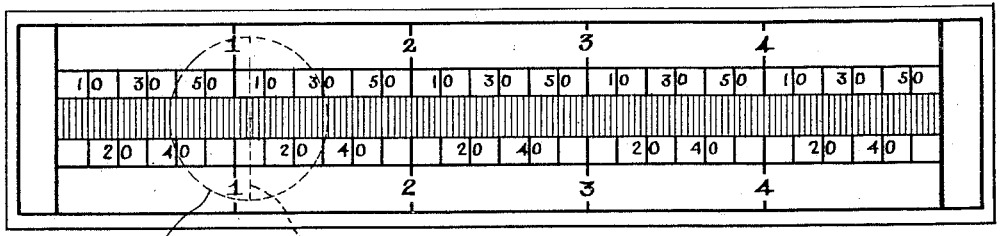

62    63   Fig. 7.

THIRD MOVEMENT

FIFTH SYMPHONY OF BEETHOVEN

VICTOR 9031-A

ALLEGRO (SCHERZO)

FIRST THEME – C MINOR   0:16

CELLOS AND BASSES

SECOND THEME – BASIC MOTIVE – C MINOR   0:44

STRINGS

FIRST THEME IN B-FLAT MINOR BY CELLOS AND BASSES.   1:03
FIRST THEME DISSOLVED.   1:15
SECOND THEME, C MINOR.   1:27
FIRST THEME, C MINOR.   1:43

TRIO

A FUGUE SUBJECT IN C MAJOR BEGINNING IN CELLOS AND BASSES.   2:13

CELLOS AND BASSES

REPETITION OF THE EXPOSITION OF THE FUGUE.   2:28
HUMOROUS "FALSE STARTS" IN THE DEVELOPMENT SECTION
OF THE FUGUE.   2:44
THE DEVELOPMENT GETS UNDER WAY.   2:50
MORE "FALSE STARTS."   3:10
THE RECAPITULATION BEGINS WITH A RESTATMENT OF THE
FIRST THEME IN C MINOR.   3:44
FIRST THEME REPEATED.   3:58

INVENTOR.
WILLIAM OTTO MIESSNER
BY
ATTORNEY.

Patented Dec. 6, 1938

2,138,875

UNITED STATES PATENT OFFICE 2,138,875

THEME FINDER

William Otto Miessner, Deerfield, Ill.

Application July 15, 1936, Serial No. 90,641

9 Claims. (Cl. 274—1)

The present invention relates to theme finders, and, more particularly, to theme finders adapted to be used in connection with phonograph and similar sound records to permit locating and charting the entire or selected portions of the record, such as themes of a musical composition, opera, or the like.

It is well known to those skilled in the art that phonograph and similar records are widely used for the enjoyment and appreciation of music and in the instruction of music and of languages. According to the conventional procedure, the person or student was provided with an instruction book or sheet containing information relating to the matter recorded. While listening to the record being reproduced, the student would follow the visual and acoustical perception. This had the disadvantage that the student had to concentrate his attention both to the matter read and heard during the full length of the record, even though he desired to study only certain selected portions of the records, for example, certain musical themes in a musical composition or the correct pronunciation of certain selected words or sentences in a language record. If it was desired to repeat a certain portion of the matter recorded for closer and repeated study, it was generally necessary to repeat all of or the greater part of the record which caused great loss of time and efficiency and undue wear on the record. It has already been suggested to provide a theme finder in the form of a plate-like member having a longitudinally extending straight phonograph needle guiding slot enlarged at one end to receive a rotatable phonograph post or arbor. The portion of the member adjacent to said slot has been provided with graduations indicating the number of revolutions of the record or the number of minutes and seconds, the needle of the phonograph serving as a pointer. This device was simple and inexpensive and operated satisfactorily, but, of course, the accuracy obtainable was rather limited and the facility was limited and restricted. Another suggestion embodied a pointer member and a complicated mechanism which has been displaced by the movement of the tone arm of the phonograph by means of a complex mechanical connection. The pointer co-operated with a printed sheet or chart having certain legends thereon correlated to the record, so that during the reproduction process the pointer or indicator member successively pointed out the portions of the legend corresponding to the matter reproduced at that particular moment. This arrangement had the disadvantage of being complicated and expensive and beyond the means of the average student or person. Moreover, the load on the tone arm of the phonograph caused by the complex mechanical transfer mechanism, was excessive and required specially constructed phonographs and tone arms. Of course, it was practically impossible to embody this mechanical principle into conventional phonographs or tone arms, but the whole phonograph had to be redesigned and manufactured specially. Although various other suggestions and attempts have already been made to solve the outstanding problem, none, as far as I am aware, of these various suggestions and attempts was completely satisfactory and successful when carried into practice on a practical and commercial scale.

I have discovered that the outstanding problem may be solved in a remarkably simple manner.

It is an object of the present invention to provide an improved theme finder which eliminates the disadvantages and inconveniences of conventional devices.

It is another object of the invention to provide a theme finder of novel and improved character which enables a person to follow the music easily and instantly in a progressive and continuous manner and which permits quickly and accurately locating selected or predetermined portions of a record for the purpose of obtaining increased benefit or enjoyment from the recorded music or matter.

It is a further object of the invention to provide a theme finder for phonographs and the like sound reproducing devices which is actuated by the displacement of the tone arm of the phonograph without increasing the weight of or the load on the tone arm to any substantial extent.

Moreover, the invention contemplates a weightless indicating element, such as a light beam and a suitable scale co-operating therewith, for denoting the portion of the record being reproduced and which can be observed simultaneously by a large number of persons, for example by a number of persons in a living room or a number of students present in the same class room or an audience in a theatre.

It is also within the contemplation of the invention to provide a simple and inexpensive attachment for conventional phonographs which may be attached to any conventional tone arm without requiring structural changes, and which permits quick and accurate indication of the position of the tone arm and needle with respect to any groove on the record.

Other and further objects and advantages of the invention will become apparent from the following description taken in conjunction with the accompanying drawing in which:

Fig. 1 illustrates a top elevational view of a phonograph having a theme finder associated therewith and embodying the principles of the present invention;

Fig. 2 depicts a longitudinal sectional view, somewhat fragmentary, of a theme finder according to the invention, having the form of an attachment adapted to the conventional phonograph tone arm;

Fig. 3 is a cross sectional view taken on line 3—3 of Fig. 2;

Fig. 6 shows a scale calibrated in minutes and seconds for measuring the displacement of the tone arm on the record, and;

Fig. 7 illustrates a chart bearing instructive or explanatory matter correlated to the readings on the scale.

Figure 4:
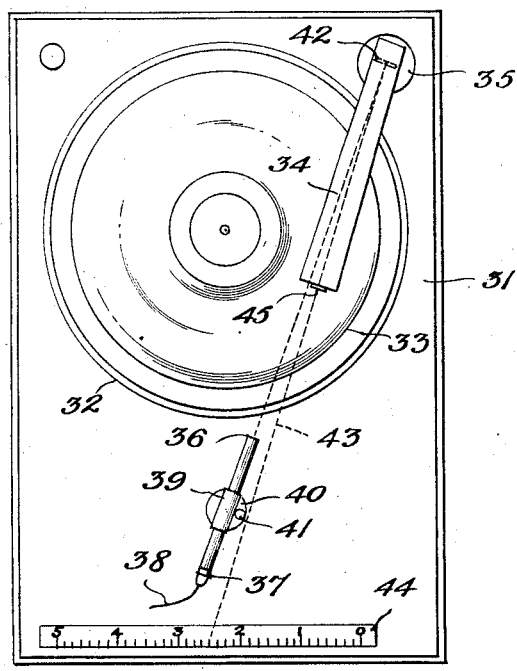
Fig. 4 shows a modified embodiment of the invention in which a mirror is provided on the tone arm of a phonograph for reflecting an indicator light beam.

Broadly stated, according to the principles of my invention I dispense with the conventional direct and mechanical connection between the tone arm and the pointer mechanism and employ an electrical or optical system. I have found that a light beam of suitable character is especially advantageous for use as a pointer which is displaced directly by and progressively with the displacement of the tone arm. Accordingly, I provide a source of light, preferably an incandescent lamp of small dimensions. I associate a system of lenses or other optical means for concentrating the emission of light rays from the lamp into a relatively narrow and substantially parallel beam of light. The light source and the optical system may be united in a simple cylindrical projector member which may be mounted on the tone arm or pick up arm of the phonograph in spaced relationship therewith. The projector member will emit a concentrated and narrow beam of light, the direction of which will vary in accordance with the position of the tone arm and needle, etc., on the record. A stationary scale is provided at a suitable distance from the tone arm and in such position that the light beam will impinge thereon and will indicate a portion of the scale corresponding to the momentary position of the tone arm on the record. Of course, the sensitivity of the arrangement increases with the distance of the projector member from the scale so that by arranging scale and projector at a substantial distance from each other great accuracy can be obtained. At the same time, it is also possible to employ a scale of large dimensions on which the position of the indicating light beam may be simultaneously observed by a whole classroom or a lecture hall or a theatre. In view of the fact that the projector member can be made very small and light, it will not substantially add to the weight of the tone arm and will not appreciably affect its conventional and correct operation. The projector member can be designed in such form as to be inseparably connected and integral with the tone arm, or it may be designed in the form of an independent unit which is removable and which may be attached by means of a spring-like clip, a fastening screw or bolt or some other fastening element to the tone arm.

Although the weight of the small projector unit according to the principles of my invention is very small, in some cases I prefer to further reduce the weight of the indicating structure. This can be accomplished for example, by mounting the projector member into a stationary position on the phonograph cabinet and to provide a small mirror on the tone arm adapted to reflect the light beam emanating from the projector onto a suitable and stationary scale. The advantages of this modified embodiment are obvious. The weight of the mirror is insignificant, so that the tone arm will remain as light and efficient as prior to the installation of the theme finder. According to a further modification of the invention, the projector member is provided within the phonograph cabinet and is rigidly connected to a shaft or tube which rotatably supports the tone arm. A transparent scale is provided in one of the side walls of the phonograph cabinet so that the light beam of the projector member, which is following all displacements of the tone arm accurately and progressively, will clearly indicate the momentary position of the needle on the record.

Referring now more particularly to Fig. 1 of the drawings, a phonograph cabinet 1 is provided with a conventional turntable 2 supporting a record 3 rotatably mounted thereon. A tone arm 4 is pivotally mounted on a base 6 and supports a needle 5 co-operating with the record in a conventional manner. The sound reproducing mechanism associated with the needle 5 may be of any conventional character, such as for example, a sound box, an electro-magnetic or piezo-electric pick up, and the like. On the tone arm I provide a projector member 7, attached to the arm by means of a resilient clip 23. The projector member is adapted to emit a narrow, concentrated and powerful beam of light when energized through cable 12, the light beam 13 falling on a scale 14 arranged at some distance from the projector member permits accurate determination of the position of the tone arm by means of a black cross hair on the illuminated circular field having the appearance of a bisected illuminated disc.

The preferred form of construction of my projector member is shown in Figs. 2 and 3. The projector member essentially comprises a hollow tubular member 7, a socket 11 inserted into one end of said tubular member, and a lamp 15 in said socket. Lenses 16 and 20 are provided in slidable tubes 17 and 19, respectively, to concentrate the light emitted by lamp 15 into a narrow, concentrated and parallel beam 13 of light which illuminates a small circular field with a black cross hair 18 extending diametrically and vertically across the field. An electric cord 12 is provided for supplying lamp 15 with current. Tubular member 7 is provided with fastening elements for mounting the projector member on the tone arm of a phonograph. The tubular member is surrounded by a slidingly fitting tube 8 which is soldered or otherwise connected to disc 9. This disc rotatably supports a similar disc 21 by means of the centrally located screw 22. A setting screw 10 permits locking of discs 9 and 21 in any desired relative position. Lower disc 21 is provided with a pair of suitably formed clips 23 which make it possible to attach the projector member to the tone arm of a phonograph either by the resilient pressure of the clips or by means of a bolt (not shown) passed through openings provided in the lower portion of the clips 23. Tube 17 which supports lens 16 also carries cross hair 18 which will appear as a well defined shadow in the light beam 12 and will act as a pointer on scale 14.

From the foregoing description, the operation of my improved theme finder will be readily understood by those skilled in the art. First of all the projector member is securely fastened to the tone arm of the phonograph by means of clips 23. Hereafter, the lamp contained in the projector member is energized by connecting cord 12 to an electric power line. By means of suitable sliding adjustment of the lenses in the projector member, a well-defined, substantially parallel and narrow beam of light will be projected and a small concentrated image preferably of circular shape, will be thrown upon screen 14. Likewise, by slightly loosening set screw 10, the relative direction of the tone arm and of the projector member is easily adjusted to have the light beam project onto the zero indication of the scale when the position of the arm and needle corresponds to the outermost groove or beginning of the record. After the desired adjustment has been obtained, the set screw is tightened and thus the desired adjustment has been retained for future operation of the device. Of course, after this adjustment has been made for a certain type of a phonograph no readjustments will be necessary so long as the position of the scale 14 remains unchanged. I have found that it is preferable to provide scale 14 with a calibration of minutes and seconds relating to the running time of the records although obviously other divisions of the scale, such as for example revolutions of the record, may be employed. The distance between the scale and the projector member is to be such that the scale should be easily and readily discernible, visible and readable to a number of persons at the same time. While the record is being played or rotated by the turntable of the phonograph, the tone arm will be slowly displaced from the right to the left, and, accordingly, light beam 13 will be moved on scale 14 from the left to the right and will accurately indicate the position of the tone arm so that printed matter interpreting or explaining the music may be readily co-ordinated to the sound heard as more fully explained hereinafter.

Fig. 4 depicts a modified embodiment of my invention in which the projector member is arranged in a stationary position and a mirror, a prism or other reflecting optical means is provided on the tone arm to reverse the direction of the light beam emanating from the projector towards a scale. In this modified embodiment cabinet 31, turntable 32, phonograph record 33, and tone arm 34, rotatably supported by pivoting member 35 correspond to similar parts illustrated in Fig. 1. Tone arm 34 carries a needle 45 in the usual manner. I also provide a projector member comprising tubular member 36, lamp socket 37, and cable or cord 38 of similar construction to the one illustrated in Figs. 2 and 3, and having fastening and adjusting elements 39, 40 and 41 associated therewith. In this embodiment, however, the projector member is stationary and is supported by the smooth upper panel of the phonograph cabinet preferably by its own weight accentuated by a heavy base piece (not shown), or by means of a suction cup or the like, although, of course, screws, bolts or the like may be employed with similar results. The light beam emanating from the projector member co-operates with a reflecting member 42 fastened to the upper surface of the tone arm substantially above the pivoting point thereof. The reflecting member will reverse the direction of the light beam and if the projector member is correctly adjusted, the light beam will be projected onto translucent scale 44 and will accurately indicate thereon the position of the tone arm and needle on the record. Reflecting member 42 may be in the simplest case a mirror which is mounted or cemented to the tone arm in any conventional manner. In view of the similarity of construction the operation of this modified embodiment will be readily understood by those skilled in the art without any further explanation. It may be observed, however, that this embodiment has the particular advantage of great simplicity of construction and operation. Moreover, the only member supported by the tone arm is the mirror or other reflecting member, which is of very light weight and of small dimensions so that the operation, weight or balance of the tone arm is not appreciably changed, so that this embodiment is particularly adapted to be used as an attachment to conventional phonographs.

Figure 5:
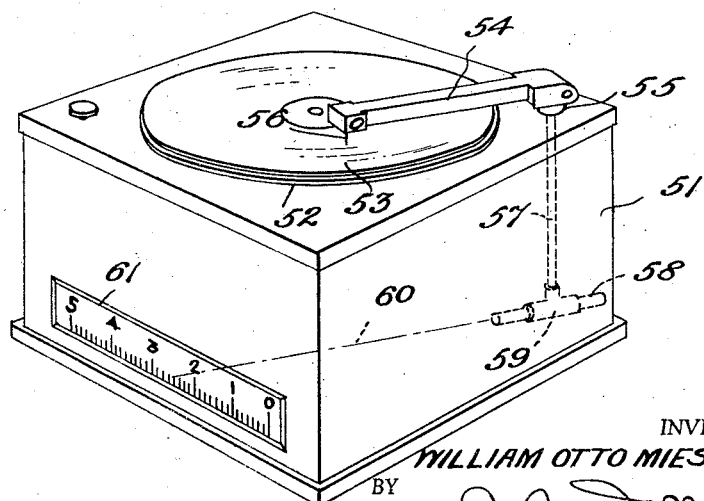
Fig. 5 depicts a perspective view of a phonograph redesigned according to the principles of the present invention, to embody my improved theme finder device.

Fig. 5 illustrates a further modified embodiment of the invention in which a specially designed tone arm structure is combined with a projector member arranged within the phonograph cabinet. In this modified embodiment, I provide a cabinet 51 rotatably supporting a turntable 52 having a record 53 placed thereon. Conventional driving means (not shown) for the turntable are provided within the cabinet. A tone arm 54, carrying needle 56 is pivotally mounted in a sleeve-like supporting member 55 and is provided with a downwardly extending tube or rod 57 supporting projector member 58 at the lower end thereof by means of a connecting piece 59. Projector member 58 is of similar construction to the one illustrated in Figs. 2 and 3 and is adapted to throw a well-defined and sharp beam of light onto translucent scale 61 provided in one of the side walls of the cabinet. As clearly appears from Fig. 5, due to the rigid connection of the tone 54 and of the projector member 58 by means of tube 57, displacements of the tone arm during reproduction of the record will be accurately followed by displacements of the light beam 60 on scale 61 and will permit exact determination of the position of the needle on the record at any time during operation of the phonograph.

The method and the devices according to the present invention solve a problem which is almost as old as the musical art. Music, the so-called "universal language", is necessarily less direct than speech in conveying meaning to the listener. It can appeal pleasurably to the physical senses through suggesting rhythmic movements, as in the many forms of the dance; it can arouse, by unconscious association, certain feelings or emotions; again, it can by conscious association, portray fairly definite descriptions or characterizations of objective situations that stimulate the imagination or poetic fancy; and finally, it can appeal to the intellect by evoking abstract thought through its structural design.

Dance music requires no guide, although it is helpful to know the national traits of the people to whom certain dances are indigenous, the pace and the style of the movements, the measure and the characteristic rhythms peculiar to each. It is when he is asked to listen to music that is supposed to stir the emotions, or to stimulate the imagination, or to induce awareness of architectural relations that the layman is usually lost in a maze of tones. Even though the program handed him at an orchestral concert may tell him what he is supposed to hear, it cannot tell him when any given event or situation will take place. Likewise, the analytical notes usually supplied with albums of recorded symphonic music tell the purchaser in vague terms what he should hear, but give him only approximate clues as to when the themes begin or where they may be "spotted" on each record.

The would-be musical connoisseur is left as helpless as an art lover who might look for a certain painting in an art museum where, to be sure, a printed guide is furnished, but where no gallery and not a single painting bears a distinguishing number, label or title. Just so, the music lover needs a guide to identify the significant musical themes when he attempts to penetrate the depths of musical art.

Since familiarity is one key to the understanding of music, the phonograph offers an ever-ready opportunity to hear the great masterworks repeatedly. It would seem a foregone conclusion, therefore, that many more intelligent persons would grasp the means offered by recorded music to acquaint themselves with it, provided that it were made possible for them to recognize the themes when and as they listen to them, and to know them intimately by repeated hearings. In the absence of an informed personal guide, it is practically impossible for any layman to recognize with certainty most of the important situations, pictures or moods in a complicated piece of symphonic music. It is almost equally important for the truly appreciative listener to recognize the main divisions of a classical symphony. Likewise, even habitual concert-goers have difficulty in distinguishing the tones of the more unusual instruments, and some of the manipulated tone qualities. A new satisfaction is obtained when all of these distinctive structural elements of music are identified for the listener, and a still greater pleasure awaits him when he can recognize them unaided. To make possible and to facilitate this fuller understanding and this deeper insight into the essence of musical composition by means of the devices described hereinabove and by means of the charts to be described hereinafter, is the principal problem contemplated and solved by the principles of the present invention.

In order to give those skilled in the art a better and clearer understanding of the use of the invention, the following illustrative example is given.

Referring to Figs. 6 and 7, Fig. 6 depicts a scale which I prefer to use in connection with my theme finder device, and Fig. 7 illustrates a typical chart containing the musical notation, the explanatory matter, a series of time indicia coordinated with the musical notation and explanatory matter and with other pertinent information. The scale has 5 main divisions representing minutes, four minutes being the average playing time of a standard twelve-inch record. Graduations indicating seconds are provided in between the main divisions. As has been explained hereinabove, the indicator light beam 62, or the shadow of the cross hair 63 in the projector member displaced in accordance with the displacement of the tone arm will accurately indicate on the scale to portion of the record being reproduced in terms of playing time or in minutes and seconds.

Fig. 7 illustrates by way of example a chart embodying the principles of my invention and containing explanative matter correlated to a record. The top portion of the chart bears the title of the composition, for example, Third Movement, Fifth Symphony of Beethoven, the identifying name or number of the record, under which it is known and is obtainable in the trade, as, for example, "Victor 9031-A", and similar information. On the lower part of the chart, the principal themes of the composition in musical notation, such as the first theme and the second theme, appear. On the right side of the chart numbers or indicia appear denoting the time in minutes and seconds from the time the reproduction has been started, to the time when the themes will appear. Thus, from the chart depicted in Fig. 7, it clearly appears that the first theme begins 16 seconds after starting the record, the second theme 44 seconds after, the first theme is completed 1 minute and 15 seconds after the reproduction started. In this manner, by following the displacement of the indicating light beam on the illustrated scale, the sound sensations heard can be accurately coordinated with the description of the themes or other information contained on the chart and through understanding of the musical composition is made possible.

It is to be noted that the method and the various devices, including my novel chart, embodying the principles of the present invention provide a number of important advantages. First of all, a novel and extremely efficient device is provided which permits exact determination of the position of the tone arm on a phonograph record any time during the reproduction process.

It is also to be observed that the devices contemplated by my invention are very simple in construction and inexpensive to manufacture on a commercial scale.

Moreover, the indications provided on the scale of my improved theme finder are of such size and character, that they are easily discernible by a large number of persons in the same room or class, so that the instruction may simultaneously benefit all persons or students present in a class, lecture hall or theatre.

Furthermore, I provide an improved chart bearing musical notations and description of the themes of a musical composition with indications in minutes and seconds to enable the student to correlate acoustical instruction obtained by listening to the record, to the visual instruction obtained from the chart.

Although I have described my invention in connection with a few preferred embodiments thereof, various modifications may be resorted to by those skilled in the art without departing from the principles of the present invention. Thus, instead of directly varying the direction of a light beam by displacements of the tone arm, displacements of the tone arm may be used to first modify the intensity of an electric current, and the obtained current may be used to deflect a mirror, a needle or some other type of an indicator member which co-operates with a suitable scale. Modifications of an electric current in accordance with the position of the tone arm may be obtained, for example, by providing an electrical resistance adjacent to the tone arm and having a sliding contact associated with the arm engage the surface of the resistance to introduce a greater or smaller part thereof into an electrical circuit including the measuring device.

I consider all of these variations and modifications within the true spirit and scope of the present invention as disclosed in the present specification and defined by the appended claims.

I claim:—

1. In a theme finder, the combination comprising a source of light, means for concentrating light emitted by said source into a light beam, means actuated by the tone arm of a phonograph for varying the direction of said light beam in accordance with displacements of said tone arm on a sound record, and a scale cooperating with said light beam for denoting the position of said tone arm.

2. In a theme finder, the combination comprising a projector member adapted to emit a beam of light, means for mounting said member on the tone arm of a phonograph to cause variation of the direction of said beam of light in accordance with displacements of said tone arm on a sound record, and a stationary calibrated scale cooperating with said beam of light for indicating the position of said tone arm on a sound record.

3. In a theme finder, the combination comprising a projector member adapted to emit a beam of light, means for securing said member on the tone arm of a phonograph, and means for adjusting the position of said member with respect to the tone arm, said beam of light emitted by said projector member being adapted to cooperate with a calibrated scale to indicate the position of a tone arm on a record.

4. In a theme finder, the combination comprising a source of light, optical means for concentrating light emitted by said source into a light beam, means for fastening said source of light and said optical means to the tone arm of a phonograph, means for varying the position of said source of light and of said optical means on said tone arm to adjust the direction of said light beam with respect to the tone arm, and a scale for receiving said beam of light and for indicating the position of said tone arm on a sound record.

5. In a theme finder, the combination comprising a tubular projector member, a source of light inserted into one end of said tubular member, a plurality of lenses located in said member to concentrate light emitted by said source into a beam of light, means for fastening said tubular member to the tone arm of a phonograph, means for adjusting the axis of said tubular member with respect to the tone arm, and a scale adapted to cooperate with said beam of light whereby a continuously visible indication of the position of said tone arm on a sound record is obtained.

6. In a theme finder, the combination comprising a tubular projector member, a lamp socket arranged in one end of said tubular member, an electric lamp in said socket, a plurality of lenses slidably arranged in said tubular member and adapted to concentrate light emitted by said lamp into a beam of light, means for attaching said tubular member to the tone arm of a phonograph, and means for adjusting the position of said tubular member with respect to said tone arm, said beam of light emitted by said tubular projector member being adapted to cooperate with a calibrated scale to indicate the position of a tone arm on a record.

7. In a theme finder, the combination comprising a tubular projector member, a lamp socket inserted into one end of said tubular member, an electric lamp in said socket, a plurality of lenses adjustably arranged in said tubular member and adapted to concentrate light emitted by said lamp into a beam of light, a cross hair located in said tubular member and interposed in the path of said beam of light, a sleeve slidingly receiving said tubular member, an upper disc rigidly connected to said sleeve, a lower disc rotatably supporting said upper disc and having fastening elements associated therewith adapted to engage the tone arm of a phonograph, and a set screw adapted to lock said upper disc in a desired position with respect to said lower disc and said tone arm, said light beam emitted by said tubular member being capable of cooperating with a stationary scale to denote the position of said tone arm on a sound record.

8. In a theme finder, the combination comprising means for producing a narrow beam of light, means for attaching said light beam producing means to the tone arm of a phonograph, and means for adjusting the direction of said light beam with respect to the tone arm, said light beam being adapted to cooperate with a calibrated surface to provide a continuously visible indication of the position of said tone arm on a sound record.

9. In a theme finder, the combination comprising a projector unit adapted to produce a narrow and substantially parallel beam of light, means for removably attaching said unit to the tone arm of a phonograph, means for adjusting the direction of said beam of light with respect to the tone arm, and a calibrated scale adapted to cooperate with said beam of light to determine the position of said tone arm on a record, said scale being of such dimensions as to be readily and directly discernible by a plurality of persons at the same time.

WILLIAM OTTO MIESSNER.